United States Patent
Slotte

(10) Patent No.: US 12,246,983 B2
(45) Date of Patent: Mar. 11, 2025

(54) ARRANGEMENT FOR RECYCLING MINERAL WOOL WASTE TO MINERAL WOOL PRODUCTION

(71) Applicant: SUMITOMO SHI FW ENERGIA OY, Espoo (FI)

(72) Inventor: Martin Slotte, Espoo (FI)

(73) Assignee: SUMITOMO SHI FW ENERGIA OY, Espoo, FL (US)

( * ) Notice: Subject to any disclaimer, the term of this patent is extended or adjusted under 35 U.S.C. 154(b) by 545 days.

(21) Appl. No.: 17/622,141

(22) PCT Filed: Jul. 5, 2019

(86) PCT No.: PCT/EP2019/068077
§ 371 (c)(1),
(2) Date: Dec. 22, 2021

(87) PCT Pub. No.: WO2021/004601
PCT Pub. Date: Jan. 14, 2021

(65) Prior Publication Data
US 2022/0274861 A1     Sep. 1, 2022

(51) Int. Cl.
*C03B 37/01* (2006.01)
*C03B 1/02* (2006.01)
(Continued)

(52) U.S. Cl.
CPC ........... *C03B 37/04* (2013.01); *C03B 1/02* (2013.01); *C03B 5/005* (2013.01); *C03B 5/025* (2013.01);
(Continued)

(58) Field of Classification Search
CPC .......... C03B 5/005; C03B 37/04; C03C 13/06
See application file for complete search history.

(56) References Cited

U.S. PATENT DOCUMENTS 5,496,392 A    3/1996   Sims et al.
5,709,728 A    1/1998   Fleckenstein et al.
(Continued)

FOREIGN PATENT DOCUMENTS

| CN | 107434985 A   | 12/2017 |
| JP | 3899563 B2    | 1/2007  |
| WO | 2013083464 A1 | 6/2013  |

OTHER PUBLICATIONS

CN 107434985 A (Liu) May 12, 2017 (English language machine translation). [online] [retrieved Jun. 20, 2024]. Retrieved from: Espacenet. (Year: 2017).*
Elijah, "Fibre-Reinforced Mineral Wool Geopolymer Composites," University of Oulu, Science and Technology Library Tellus, Maser Thesis, Master's Degree Programme (BCBU) in Environmental Engineering, May 2015.
Väntsi, "Utilization of Recycled Mineral Wool as Filler in Wood Plastic Composites," Acta Universalistic, Lappeenrantaensis 663, Lappeenranta University of Technology, Oct. 9, 2015.
(Continued)

*Primary Examiner* — Erin Snelting
(74) *Attorney, Agent, or Firm* — Venable LLP

(57) ABSTRACT

A method of and an arrangement for recycling mineral wool waste to mineral wool production includes at least one melting furnace for melting virgin mineral wool raw material, the melting furnace including an inlet for virgin mineral wool raw material and an outlet for molten mineral wool material, a production line connected to the outlet for molten mineral wool material for producing a mineral wool product from the molten mineral wool material. The production line includes a curing oven, a fluidized bed reactor including an exhaust gas duct, an inlet for predetermined primary fuel, an inlet for predetermined bed material, and an outlet for an ash material, the ash material including bottom ash discharged via a bottom outlet from the fluidized bed reactor or fly ash separated by a particle separator from exhaust gas in the exhaust gas duct or a mixture of the bottom ash and the fly ash.

13 Claims, 4 Drawing Sheets

(51) Int. Cl.
    *C03B 5/00*     (2006.01)
    *C03B 5/02*     (2006.01)
    *C03B 5/235*     (2006.01)
    *C03B 37/04*     (2006.01)
    *C03C 1/00*     (2006.01)
    *C03C 13/06*     (2006.01)

(52) U.S. Cl.
    CPC .............. *C03B 5/235* (2013.01); *C03C 1/002* (2013.01); *C03C 13/06* (2013.01); *C03C 2213/00* (2013.01)

(56) References Cited

U.S. PATENT DOCUMENTS

2005/0172677 A1     8/2005     Jensen et al.
2006/0042319 A1*     3/2006     Nykiel .................... C03C 3/097
                                                              65/134.8

OTHER PUBLICATIONS

Kinnunen et al.,"Mineraalivillajäte geopolymerrin raaka-aineena," University of Oulu, Oulun Yliopisto.

Notification of Transmittal of the International Search Report and the Written Opinion of the International Searching Authority, or the Declaration issued Mar. 9, 2020, in International Application No. PCT/EP2019/068077.

Notification of Transmittal of the International Preliminary Report on Patentability issued Jun. 15, 2021, in International Application No. PCT/EP2019/068077.

European Patent Office Communication R71(3) EPC (Intention to grant) in corresponding EP Application No. 19737079.4 and application text, dated Nov. 17, 2022 (31 pages).

Examination Report issued in corresponding Australian Application No. 2019/456539 dated Dec. 7, 2022 (2 pages).

* cited by examiner

ARRANGEMENT FOR RECYCLING MINERAL WOOL WASTE TO MINERAL WOOL PRODUCTION

CLAIM OF PRIORITY

This application is a U.S. national stage application of International Patent Application No. PCT/EP2019/068077, filed Jul. 15, 2019, now published as International Publication No. WO 2021/00461 on Jan. 14, 2021.

BACKGROUND OF THE INVENTION

Field of the Invention

The present invention relates to an arrangement for and a method of recycling mineral wool waste into raw materials while generating heat and power for mineral wool production plants.

Description of Related Art

Mineral wool is generally manufactured by melting a selection of rocks or minerals at a very high temperature and spinning the molten material into fibers having, typically, a diameter of 2 to 8 µm and a length of 1 to 3 mm. A binder, typically, a resin mix, is sprayed during the spinning process onto the fibers, as they are formed. The fibers are collected after formation as a flexible mat. Once the fibers are collected and layered into the desired thickness, the resin is cured in a curing oven. Once cured, the continuous mat or slab is cut to specification depending on the final product application. A typical mineral wool production line produces around 5 to 10 tons of product per hour.

Two main technologies exist for melting the minerals, coke firing cupola furnaces and electrical arc furnaces. The cupola furnace uses the combustion of coke in a flow of hot air, or blast air, to melt a mixture of raw materials transforming it into the melt. In electrical arc furnaces, the melting of the raw material is obtained by electrical power generated by electrodes immersed in the melt. One mineral wool production plant can have a combination of melting technologies for separate production lines.

The flue gas from a cupola furnace has a high carbon monoxide content, on the order of 10%, and a low oxygen content. This flue gas has a decent heating value and is normally combusted using incinerators. The heat can then be used to preheat the blast air needed for the cupola furnace.

Currently, waste mineral wool is recycled to some extent by shredding it and forming it into briquettes together with undersize virgin raw materials. This is done in order to get a suitable particle size for the melting furnaces and so that the light wool will not be carried away by the flue gas. This also applies to waste material and scrap produced in the process. Another way to recycle mineral wool is to mix it into bricks. A large part of the mineral wool waste is landfilled. Work is ongoing to find new ways to recycle waste mineral wool.

Japanese patent publication JP3899563B2 shows a method of treating a waste of fiber-reinforced polymer in a mixture comprising, for example, rock wool shot refuse and gravel-like rock wool raw materials. The mixture is supplied to a waste incinerator utilizing a gas burner as an auxiliary heating apparatus, so that organic substances are burned and removed. Immediately after the treatment, the resultant mixture is supplied without cooling to an electrical arc furnace, wherein the mixture is melted at about 1450° C. and the heated raw materials in the melted state are supplied to a fiber-making apparatus for rock wool and converted into rock wool fibers. As a result, raw material mixtures are made re-usable as rock wool fibers.

Chinese Patent Publication CN107434985 discloses a treatment system for fly ash and ash of a fluidized bed gasifier comprising a fluidized bed gasification furnace, a molten pool arranged in a lower portion of the fluidized bed gasification furnace, which molten pool can store, burn and melt fly ash and ash, and a slag wool production unit installed in a lower portion of the fluidized bed gasification furnace is coupled to the melt discharge port of the molten pool.

U.S. Pat. No. 5,496,392A discloses a process for the production of, e.g., slag-based products, such as mineral wool, from industrial waste materials, wherein steam from a waste heat boiler is used to power the mineral wool production station.

International patent publication WO2013083464 discloses a method of making a mineral melt for, for example, forming mineral fibers by burning combustible material in a cyclone furnace in the presence of particulate mineral material and waste mineral wool, thereby, forming exhaust gases and a melt, the method comprising collecting the mineral melt and passing the exhaust gases upwards through an exhaust pipe to a conduit of a heat exchange system, and supplying particulate mineral material and a first portion of waste mineral wool into the conduit and pre-heating the supplied material in the heat exchange system.

An object of the present invention is to provide an advantageous arrangement for and a method of recycling mineral wool waste in which the problems of the prior art are avoided or minimized.

SUMMARY OF THE INVENTION

According to one aspect, the present invention provides an arrangement for recycling mineral wool waste to mineral wool production comprising at least one melting furnace for melting virgin mineral wool raw material, the melting furnace comprising an inlet for virgin mineral wool raw material and an outlet for molten mineral wool material, a production line connected to the outlet for molten mineral wool material for producing a mineral wool product from the molten mineral wool material, wherein the production line comprises a curing oven, a fluidized bed reactor comprising an exhaust gas duct, an inlet for predetermined primary fuel, an inlet for predetermined bed material and a bottom outlet for an ash material, the ash material comprising bottom ash discharged via an outlet from the fluidized bed reactor or fly ash separated by a particle separator from exhaust gas in the exhaust gas duct or a mixture of the bottom ash and the fly ash, together with particles of bed material removed from the fluidized bed reactor, wherein the fluidized bed reactor comprises an inlet for mineral wool waste, whereby the ash material comprises fine mineral wool material powdered from the mineral wool waste in the fluidized bed reactor, and the melting furnace has a further inlet for the ash material so as to use the ash material as a further mineral wool raw material.

The fluidized bed reactor is advantageously a circulating fluidized bed boiler, wherein the bed material is in a vigorous movement causing efficient pulverizing or breaking down of the bed particles, including of the mineral fibers of the mineral wool waste, in the fluidized bed reactor. Generally, mineral wool waste contains fibers of mineral material and organic resin binder. In the fluidized bed reactor, the organic binder burns, typically, at a temperature of 500° C., providing additional heat to the reactor. The temperature of the reactors stays below the melting temperature of the mineral material, which is typically around 1200 to 1500° C. It is also possible that, in some applications, especially, when the mineral wool waste material is of a relatively fragile mineral type, that sufficiently efficient pulverizing of the mineral fibers can be obtained even if the fluidized bed reactor is a bubbling fluidized bed reactor.

Typically, a mineral wool product has a desired composition of minerals, depending on the product. Conventionally, the composition of the mineral wool product is determined by selecting the mix of virgin raw material fed to the melting furnace. The fuel fed to the fluidized bed reactor is advantageously biofuel with suitable ash composition to substitute part of the mineral raw material. According to a preferred embodiment of the present invention, the arrangement comprises means for providing a material analysis of the composition of the produced mineral wool product, and the composition of bed material in the fluidized bed reactor is adjusted so as to obtain desired mineral composition of the mineral wool product. Alternatively, the arrangement may comprise means for analyzing the mineral composition of the mineral wool waste and/or the further mineral wool raw material, and means for determining the type or content of the primary fuel and/or bed material introduced to the fluidized bed reactor on the basis of the material analysis.

The arrangement may advantageously comprise means for sintering or briquetting the ash material so as to produce an ash product that is then conveyed to the melting furnace, to minimize the risk of escaping of the ash material from the melting furnace with exhaust gases emanating from the furnace, especially, from a cupola type melting furnace. The arrangement may also comprise means for conducting heat extracted from exhaust gas in the exhaust gas duct of the fluidized bed reactor to the mineral wool production, for example, to produce hot air for the curing oven in the mineral wool production line.

The melting furnace is generally one of a cupola furnace or an electrical arc furnace. It is also possible that a mineral wool production plant comprises a combination of melting technologies for separate production lines.

According to a preferred embodiment of the present invention, the melting furnace is a cupola furnace having an inlet for coke and the arrangement comprises means for leading coke particles having a particle size smaller than a predetermined limit from the inlet for coke to the fluidized bed reactor. Thereby, such under-size coke particles, which are typically rejected from the fuel input of a cupola furnace, can be utilized for providing additional heat in the fluidized bed reactor.

When the melting furnace is a cupola furnace that produces exhaust gas with a relatively high CO-content, the arrangement advantageously comprises means for leading CO-comprising exhaust gas from the melting furnace to the fluidized bed reactor. Thereby, the combustible exhaust gas can advantageously be utilized for providing further additional heat, or a useful gas component, in the fluidized bed reactor.

In the above described examples, the fluidized bed reactor may be a fluidized bed boiler, i.e., a steam generator. The steam is commonly lead to a steam turbine to produce electrical power. When the melting furnace is, in accordance with a further embodiment of the present invention, an electrical arc furnace, the fluidized bed reactor is advantageously a part of an energy providing plant that generates electrical power. Thereby, additional synergy can be obtained by using the electrical power generated in the plant to power the electrical arc furnace. The generated electrical power can also be used for different other purposes in the mineral wool production plant with any kind of melting furnace, for example, for producing hot air for the curing oven in the mineral wool production line.

According to another embodiment of the present invention, the fluidized bed reactor is a fluidized bed gasifier that produces combustible gas. When the fluidized bed reactor is a gasifier, the arrangement advantageously comprises means for leading a portion of the combustible gas to be combusted for producing heat in the melting furnace and/or for producing hot air for the curing oven in the mineral wool production line.

It is also possible that the arrangement comprises an electrical arc furnace as a first melting furnace that uses ash material or ash product, for example, a mixture of fly ash and bottom ash, from the fluidized bed reactor as additional raw material in the electrical arc furnace, and a cupola furnace as a second melting furnace. Thereby, the cupola furnace advantageously fires coke and may comprise means for leading undersized coke to be used as further fuel in the fluidized bed reactor, and/or means for leading CO-comprising flue gas from the cupola furnace to the fluidized bed reactor.

According to another aspect, the present invention provides a method of recycling mineral wool waste to mineral wool production, by using any of the arrangements described above. Thus, the method comprises the steps of feeding virgin mineral wool raw material into a melting furnace and melting the virgin mineral wool raw material therein, discharging molten mineral wool material from the melting furnace to a production line, treating the molten mineral wool material as a flexible mat in the mineral wool production line, which comprises a curing oven, for producing a mineral wool product from the molten mineral wool material, providing an energy containing product in a fluidized bed reactor, wherein the fluidized bed reactor comprises an exhaust gas duct, feeding predetermined primary fuel and predetermined bed material into the fluidized bed reactor, discharging ash material from the fluidized bed reactor, the ash material comprising bottom ash or fly ash or a mixture of fly ash and bottom ash together with bed material removed from the fluidized bed reactor, wherein the method comprises the steps of feeding mineral wool waste into the fluidized bed reactor, whereby the ash material comprises fine mineral wool material powdered from the mineral wool waste in the fluidized bed reactor, and feeding a portion of the ash material to the melting furnace for using the ash material as a further mineral wool raw material.

The mineral wool production comprises advantageously the step of melting the raw material and the steps of spinning, collecting, curing, and sizing the material to form the mineral wool product. The mineral wool waste introduced to the fluidized bed reactor comprises advantageously at least one of demolition waste mineral wool and process waste mineral wool from the spinning step or the sizing step of the mineral wool production line.

According to an advantageous embodiment of the present invention, the method of recycling mineral wool waste to mineral wool production comprises the steps of providing a material quality analysis of at least one of the mineral wool product, the mineral wool waste and the further mineral wool raw material, and determining the material quality of at least one of the primary fuel and the bed material on the basis of the result of the material quality analysis.

Advantageously, method may also comprise the steps of leading a stream of air to the curing oven, heating the stream of air, and conveying the stream of heated air through the flexible mat of mineral wool material so as to polymerize the binder sprayed on the material. The process generates hot, phenols containing exhaust gas which is advantageously conveyed from the curing oven to the fluidized bed reactor to heat treat the phenols and to be used as additional fluidizing gas.

Preferably, the method also comprises the step of sintering or briquetting the ash material to an ash product, and the method may also comprise the step of conducting heat extracted from exhaust gas in the exhaust gas duct to the mineral wool production, for example, to the curing oven.

According to an embodiment, the melting furnace is a cupola furnace having an inlet for coke and the method comprises the step of leading coke particles having a particle size smaller than a predetermined limit from the inlet for coke to the fluidized bed reactor. The method may advantageously also comprise the step of leading CO-comprising flue gas from the melting furnace to the fluidized bed reactor.

According to a preferred embodiment of the present invention, the fluidized bed reactor is a gasifier that produces combustible gas, whereby the method comprises the step of leading a portion of the combustible gas to the melting furnace and/or to the curing oven in the mineral wool production line.

According to another preferred embodiment of the present invention, the fluidized bed reactor is a fluidized bed boiler, advantageously, a circulating fluidized bed boiler, generating steam to a steam turbine to provide electrical power. Then, the melting furnace is advantageously an electrical arc furnace, and the method comprises the step of using the electrical power generated in the energy providing plant.

An arrangement comprising an electrical arc furnace as a melting furnace may advantageously comprise also a coke firing cupola furnace as another melting furnace firing coke. Then, the method may also comprise the steps of leading undersized coke from an inlet of the cupola furnace to be used as a further fuel in the fluidized bed reactor, and leading CO-comprising flue gas from the cupola furnace to the fluidized bed reactor.

The above brief description, as well as further objects, features, and advantages of the present invention will be more fully appreciated by reference to the following detailed description of the presently preferred, but nonetheless illustrative, embodiments in accordance with the present invention, when taken in conjunction with the accompanying drawings.

DETAILED DESCRIPTION OF THE INVENTION

Figure 1:
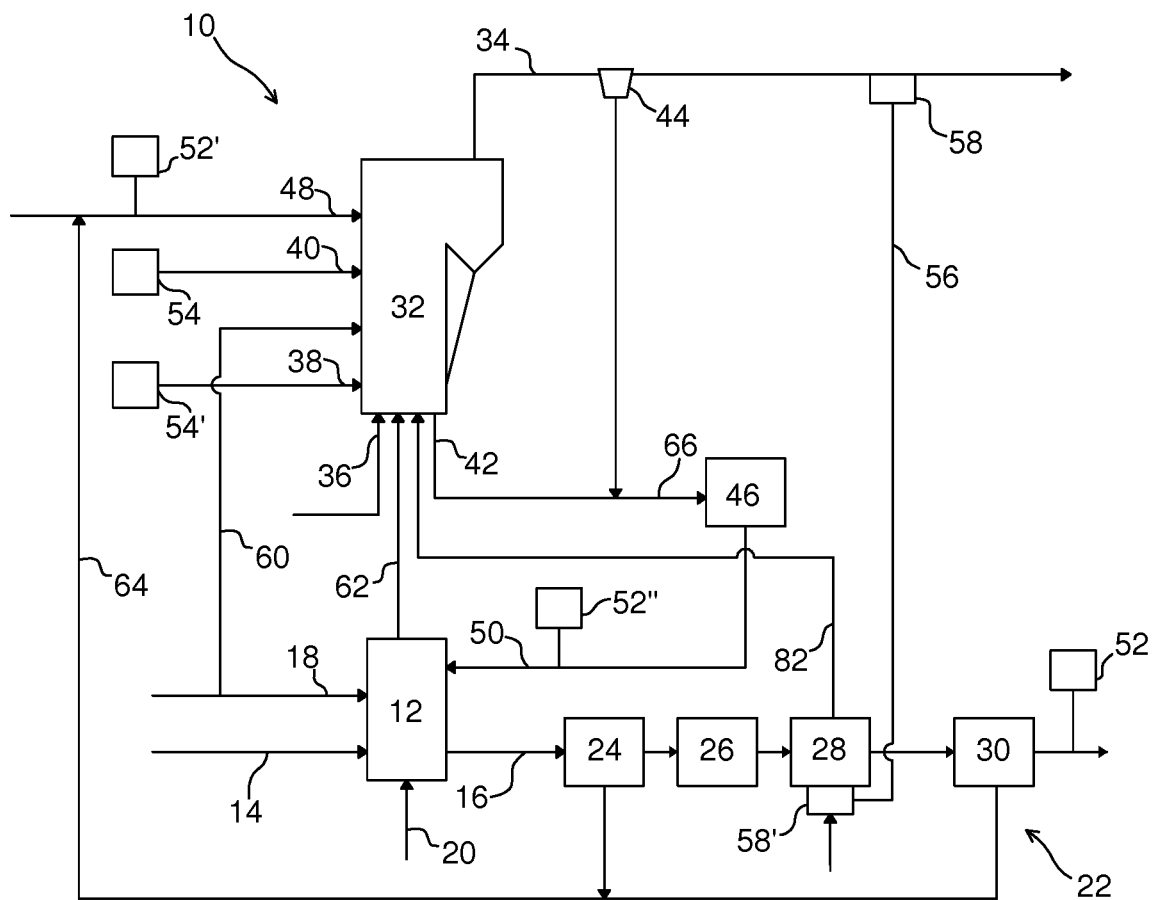
FIG. 1 schematically illustrates an arrangement according a first preferred embodiment of the present invention.

The diagram of FIG. 1 schematically illustrates an arrangement 10 for recycling mineral wool waste to mineral wool production according to an embodiment of the present invention. The arrangement comprises a melting furnace 12, which is, in this embodiment, a cupola furnace, for melting virgin mineral wool raw material. The melting furnace comprises an inlet 14 for feeding in virgin mineral wool raw material and an outlet 16 for discharging molten mineral wool material to further processing in a mineral wool production line 22. The virgin raw material is generally a mixture of minerals, selected so as to obtain a desired mineral composition in the final mineral wool product. Mineral wool may, for example, comprise the following main mineral components: CaO (14.7%), $SiO_2$ (41.9%), $Al_2O_3$ (16.5%), $Fe_2O_3$ (11.2%), $Na_2O$ (1.6%), MgO (12.2%). The inlet 14 for feeding in virgin mineral wool raw material comprises usually, although not shown in the Figures, means to render possible the selection of the virgin raw material components to be used. Such means comprises usually multiple bins for different raw materials and means to weight and control the flow of the components.

In a cupola furnace, the melting of the minerals, which generally takes place in a temperature of 1200 to 1500° C., is brought about by burning coke in the melting furnace in a flow of air, so-called blast air. Thus, the melting furnace 12 comprises an inlet for coke 18 and an inlet for blast air 20. The outlet for molten mineral wool material 16 leads to a production line 22 for producing the mineral wool product from a flexible mat of the mineral wool material, which production line generally comprises well-known stages for spinning 24, collecting 26, curing 28, and sizing 30 of the material for the product.

An element of the arrangement according to the present invention is a fluidized bed reactor 32, such as a fluidized bed boiler. As conventional, the fluidized bed reactor comprises an exhaust gas duct 34, an inlet for preheated fluidizing gas 36, usually, air, an inlet for primary fuel 38, such as biofuel, an inlet for bed material 40, such as sand, and a bottom outlet 42 for discharging bottom ash from the reactor. The exhaust gas duct 34 comprises a particle separator 44, such as a cyclone or a bag filter, for separating fly ash from the exhaust gas.

Ash material, comprising a portion of the bottom ash or the separated fly ash or a mixture of the fly ash and the bottom ash, is advantageously conducted along a line 66, together with coarse bed material removed from the bottom of the fluidized bed reactor 32 or fine bed material emanating with the exhaust gas, to a reactor 46 for sintering or briquetting the ash material to form so-called ash product.

A key element of the embodiment is that the fluidized bed reactor 32 also comprises an inlet 48 for shredded mineral wool waste. The mineral wool waste can be, for example, demolition mineral wool waste and/or mineral wool waste transported via a waste return line 64 from the spinning 24 and sizing 30 stages of the mineral product line 22. In the fluidized bed reactor 32, the binder of the mineral wool waste, typically, organic resin binder, is burned out and the fibers in the mineral wool are reduced into powder by the mechanical abrasive nature of the fluidized bed 32. Therefore, the ash product also comprises fine mineral wool material powdered from the mineral wool waste in the fluidized bed reactor 32.

If the composition of the ash is suitable, the ash can be fed as a further mineral wool raw material to the melting furnace 12. Therefore, the fuels are advantageously chosen so as to get an optimal composition for the ash. Then, the formed ash product can be lead as a further mineral wool raw material to the melting furnace 12 via an inlet for the ash product 50.

Because the ash product is generally mixed with particles of bed material removed or discharged from the fluidized bed reactor 32, it is advantageous to feed into the fluidized bed reactor via the inlet 40 bed material that has a composition that is close enough to the final composition of the desired raw material for the mineral wool making. As mineral wool is made from a mix of minerals, the composition of the bed material or the ash product does not have to precisely match the final melt composition as deviations from the normal recipes can, in many cases, be compensated for also by adjusting the ratios of components of the virgin raw material fed via the inlet 14 to the melting furnace 12.

According to a preferred embodiment of the present invention, the arrangement comprises means 52, 52', 52" for providing a material analysis of the produced mineral wool product, or the mineral wool waste to be fed to the fluidized bed reactor 32, and/or the further mineral wool raw material to be conveyed to the melting furnace 12, respectively. The results of the material analysis are then used, by means 54, 54' to determine the quality of the primary fuel and/or the bed material to be fed to the fluidized bed reactor 32. Each of the means 54, 54' may comprise, for example, a desired number of bins for alternative primary fuels and alternative bed materials and means to weight and to control the flows of the material components.

The arrangement may advantageously also comprise heat transfer means, such as heat exchangers 58, 58' connected to a piping 56 for circulating water or other suitable heat transfer medium, between the exhaust gas duct 34 and the mineral wool production line 22. By the heat transfer means, heat extracted from exhaust gas in the exhaust gas duct 34 is transferred to the curing oven 28 to provide energy needed for the curing. Heat extracted from the exhaust gas of the fluidized bed reactor can also, or alternatively, be utilized for other purposes in the mineral wool production, such as for drying draw materials before the melting.

In the curing oven 28, the energy is advantageously used for heating a stream of air that is conveyed, in a conventional way, through a flexible mat of the mineral wool material, for the polymerization of the binder, to give to the mineral wool product its density and shape. Curing by hot air produces exhaust gas comprising mainly air but also, e.g., some phenols. Conventionally the exhaust gas is heat treated in a gas fired incinerator. According to an embodiment of the present invention, the exhaust gas from the curing oven 28 is conveyed along a line 82 to the fluidized bed reactor 32 to heat treat the gas, and also to be used as additional fluidizing gas, i.e., to replace some of the primary or secondary air. The temperature of the flue gas is typically about 200 to 300° C. when it leaves the curing oven. Thus, leading the hot flue gas to the fluidized bed reactor reduces the need for preheating fluidizing gas of the reactor. Leading flue gas from a hot air using curing oven to the fluidized bed reactor can be performed in any embodiment of the present invention, independent of the way of producing the hot air.

Coke material that is used as a fuel in a cupola furnace 12 comprises often under-size particles that cannot be used because they would deteriorate the operation of the cupola furnace, for example, by escaping from the furnace. The under-size coke, such as coke having a diameter less than 50 mm, is conventionally separated to a waste stream. However, such an under-size coke can be usable fuel in a fluidized bed reactor. Thus, in the present arrangement, the separated under-size coke is advantageously fed to the fluidized bed reactor 32. According to the present invention, when the melting furnace is a cupola furnace having an inlet for coke, the arrangement advantageously comprises means 60 for leading coke particles having a particle size smaller than a predetermined limit from the inlet for coke 18 to the fluidized bed reactor 32.

Usually, a cupola-furnace produces exhaust gas with a high CO-content, such as 10%, and a low oxygen content. The exhaust gas is conventionally combusted in an incinerator. The present arrangement provides a possibility for further synergy between the melting furnace 12 and the fluidized bed reactor 32 by using the exhaust gas from the cupola furnace as a further fuel 12 in the fluidized bed reactor 32. Therefore, the arrangement advantageously comprises means 62 for leading CO-comprising flue gas from the melting furnace 12 to the fluidized bed reactor 32.

Figure 2:
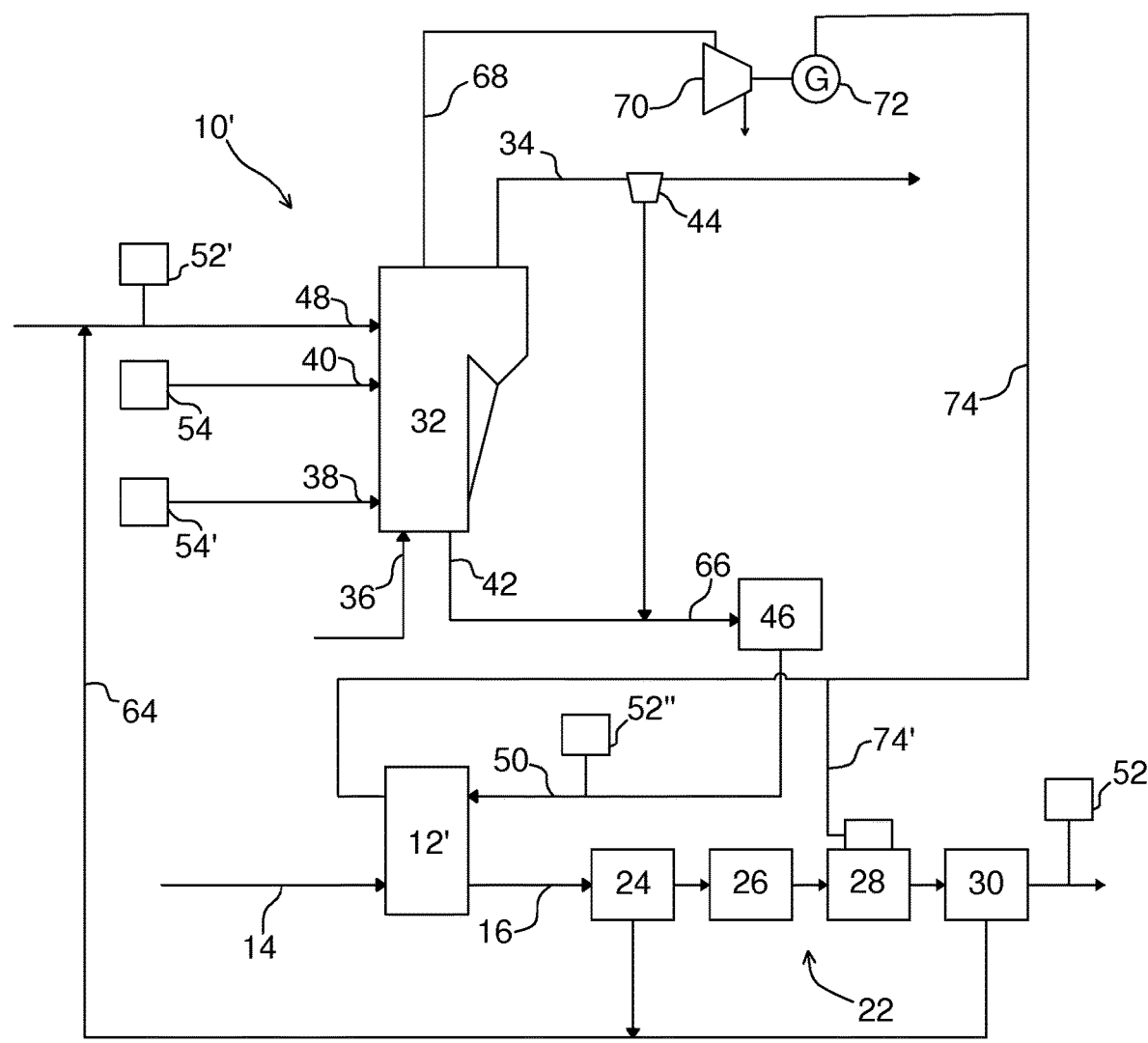
FIG. 2 schematically illustrates an arrangement according a second preferred embodiment of the present invention.

The diagram of FIG. 2 schematically illustrates an arrangement 10' for recycling mineral wool waste to mineral wool production according to another embodiment of the present invention. The arrangement shown in FIG. 2 differs from that shown in FIG. 1 mainly in that the melting furnace 12' is an electrical arc furnace instead of a cupola furnace. All reference numbers of devices or elements that are identical to or at least similar with corresponding devices or devices in FIG. 1, are referred, in FIG. 2, as well as in FIGS. 3 and 4, with the same reference numbers.

As the melting furnace 12 in the embodiment of FIG. 1, the melting furnace 12' comprises an inlet 14 for virgin mineral wool raw material and an outlet 16 for molten mineral wool material. Because the mineral material is melted in an electrical arc furnace by electrical power, instead of heat from a combustion process, there is no need to feed coke or other fuel to the electric arc furnace of the melting furnace 12'. Correspondingly, there is no means for leading under-size coke from an inlet of the melting furnace to the fluidized bed reactor, as in FIG. 1. However, there may be a need to feed in, for example, steel scrap to the melting furnace 12' to initiate the melting process. The melting furnace 12' also does not generate a significant amount of CO-rich flue gas, and generally there is no means for leading flue gas from the melting furnace 12' to the fluidized bed reactor 32.

As in the arrangement shown in FIG. 1, the fluidized bed reactor 32 comprises an inlet 48 for shredded mineral wool waste, and the ash product from bottom ash and/or fly ash comprises fine mineral wool material powdered from the mineral wool waste in the fluidized bed reactor 32. The ash product is lead to the melting furnace 12', i.e., to the electrical arc furnace 12', via an inlet for the ash product 50, whereby the ash product is used as a further mineral wool raw material. Because no blast air is introduced into the electrical arc furnace 12', it may in some applications be possible to use the ash material from the fluidized bed reactor 32 as a further mineral wool raw material without sintering or briquetting it in the corresponding reactor 46.

Advantageously, the fluidized bed reactor 32 is a fluidized bed boiler that generates steam, which steam is lead via a steam line 68 to a steam turbine 70, which is connected to a generator 72 to generate electrical power. According to a preferred embodiment, at least a portion of the electrical power is transmitted via line 74 to the electrical arc furnace 12' to be used for melting the mineral wool raw material. The generated electrical power can advantageously also be transmitted via line 74' to in the curing oven 28 of the mineral wool production line 22, to be used for generating heat, usually, hot air, therein. However, it is also possible that the curing oven is heated by other means, for example, by heat extracted from the flue gas as in the embodiment shown in FIG. 1.

Figure 3:
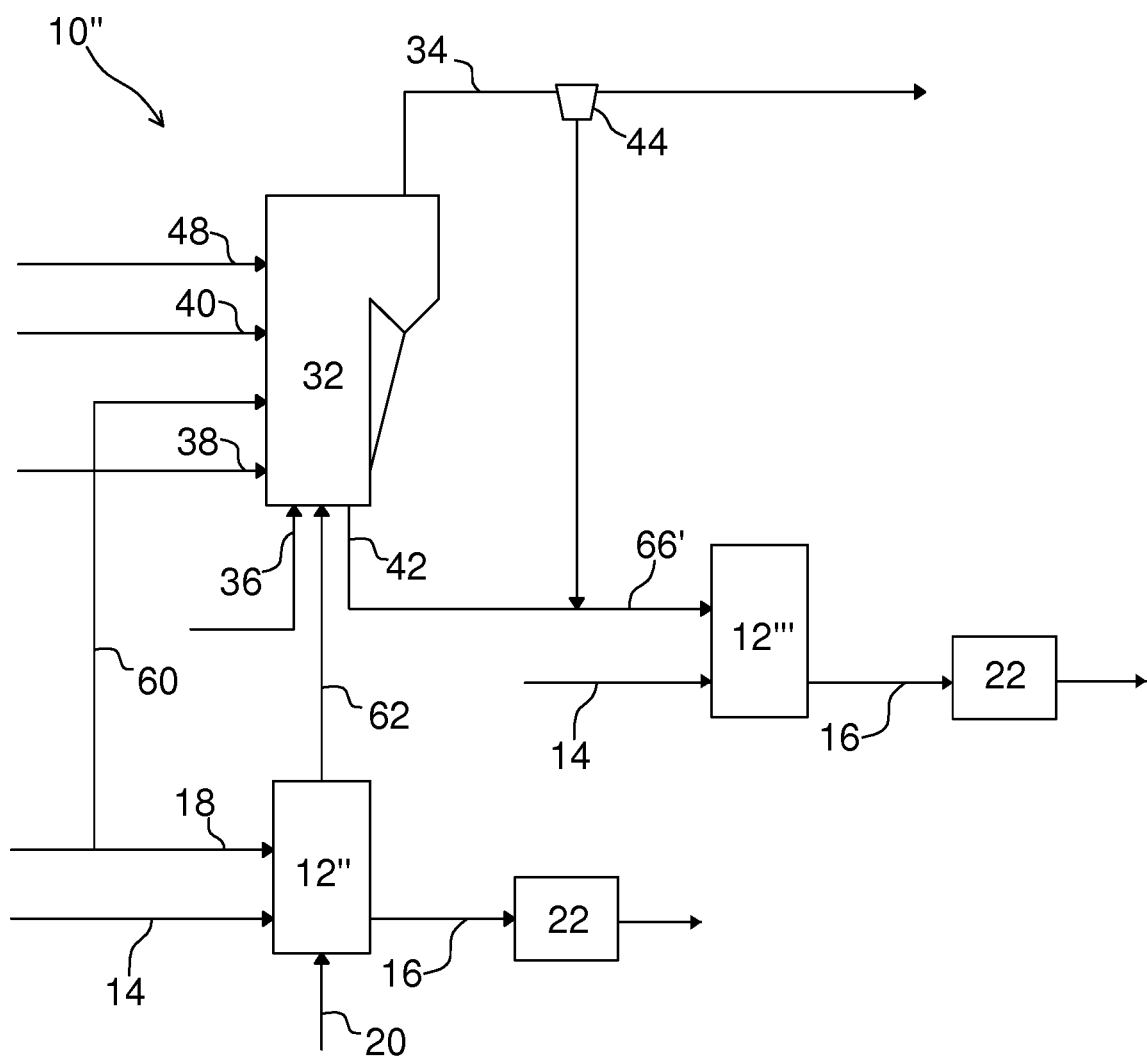
FIG. 3 schematically illustrates an arrangement according a third preferred embodiment of the present invention.

The diagram of FIG. 3 schematically illustrates arrangement 10'' for recycling mineral wool waste to mineral wool production according to a still another embodiment of the present invention. The arrangement shown in FIG. 3 differs from those shown in FIGS. 1 and 2 in that the arrangement comprises a first melting furnace 12'' and a second melting furnace 12'''. The first melting furnace 12'' is a cupola furnace and the second melting furnace 12''' is an electric arc furnace. All reference numbers of devices or elements that are at least principally identical with corresponding devices or devices in FIGS. 1 and 2, are referenced with the same reference numbers as therein.

As in the arrangement shown in FIG. 1, coke is fed as fuel to the first melting furnace, the cupola furnace 12'', and CO-rich flue gas is advantageously led from the first melting furnace, i.e., the cupola furnace 12'' via line 62 to the fluidized bed reactor 32. On the other hand, since no fuel is fed to the second melting furnace, the electrical arc melting furnace 12''', the furnace 12''' does not generate CO-rich flue gas to be led to the fluidized bed reactor 32. Both the first 12'' and the second 12''' melting furnaces comprises an inlet 14 for virgin mineral wool raw material and an outlet 16 for molten mineral wool material. Stages of the production lines 22 of the first and second melting furnaces 12'', 12''' are similar to that shown in FIG. 1, although not shown in FIG. 3. In the embodiment shown in FIG. 3, ash product or ash product from the fluidized bed reactor 32 is lead, via line 66', only to the electrical arc melting furnace 12''' so as to use it as a further mineral wool raw material in the electrical arc melting furnace 12'''.

However, it is also possible that the ash material or ash product from the fluidized bed reactor 32 is lead only to the first melting furnace, i.e., cupola furnace 12'', or that the ash material or ash product from the fluidized bed reactor 32 is lead to both the first melting furnace 12'' and to the second melting furnace 12''', to be used as a further mineral wool raw material. As is clear to a person skilled in the art, the number of melting furnaces can be even higher than two, and their types and connections to the fluidized bed reactor may vary according to the need.

FIG. 3 does not show a reactor for sintering or briquetting the ash material, but naturally, such can be used, if needed. The way to provide power to the electrical arc furnace described in connection with FIG. 2 can naturally also be used for the embodiment of FIG. 3. The curing oven can be heated by heat extracted from the flue gas, as in FIG. 1, or by generated electrical power, as shown in FIG. 2. FIG. 3 does not show determining the type of fuel or bed material to be fed to the fluidized bed reactor on the basis of material analysis of the produced mineral wool product, the mineral wool waste fed to the fluidized bed reactor, and/or further mineral wool raw material conveyed to the melting furnace, but, as is clear to a person skilled in the art, the procedures described in connection with FIGS. 1 and 2 can also be used in the embodiment of FIG. 3.

Figure 4:
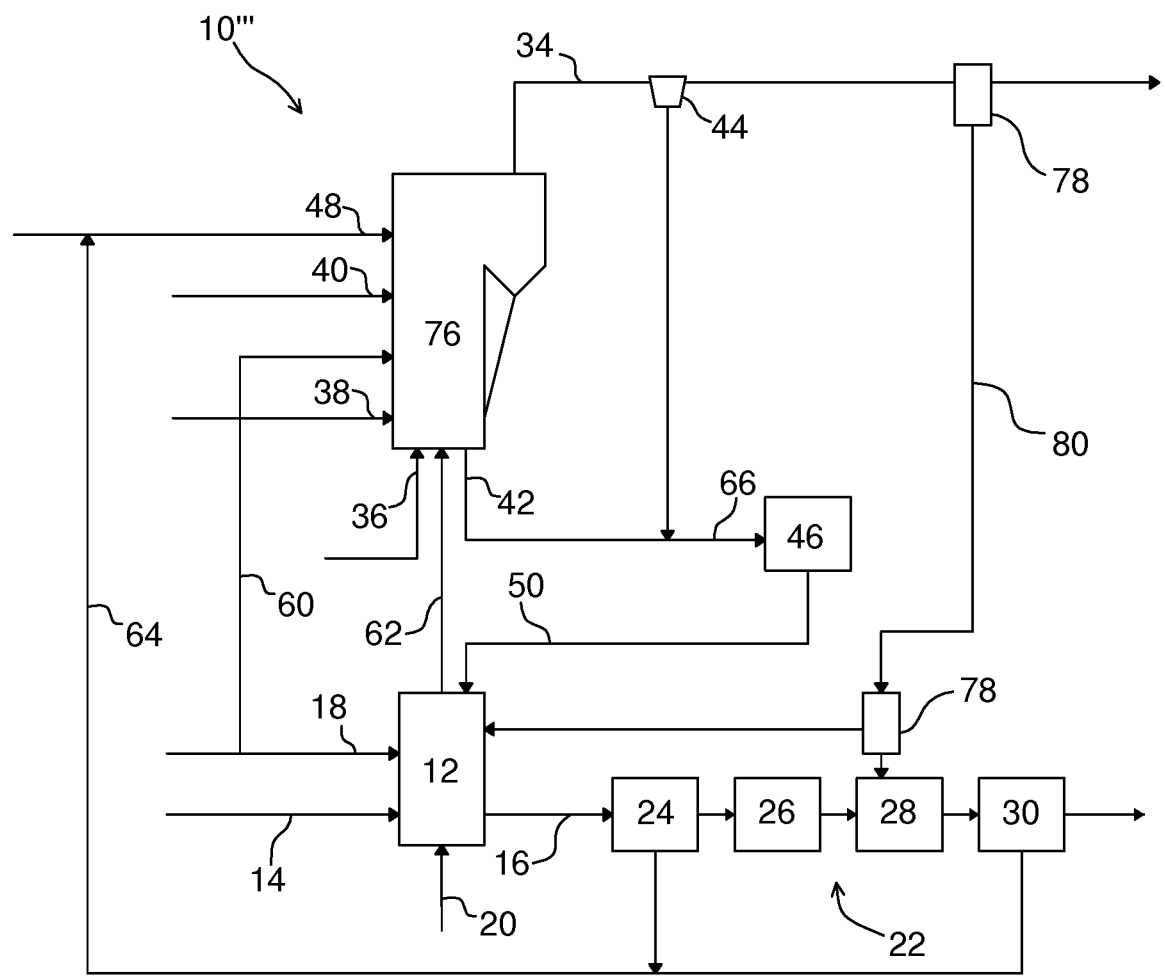
FIG. 4 schematically illustrates an arrangement according a fourth preferred embodiment of the present invention.

FIG. 4 shows an arrangement 10''' representing still another type of embodiment of the present invention, wherein the melting furnace 12 is a cupola furnace as in the embodiment shown in FIG. 1 above, but the fluidized bed reactor is a gasifier 76, that produces combustible gas. The arrangement comprises gas flow dividers 78 and a gas pipe 80 for leading at least a portion of the produced combustible gas to the cupola furnace 12 and/or to the curing oven 28 in the mineral wool production line 22.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

The invention claimed is:

1. An arrangement for recycling mineral wool waste to mineral wool production, the arrangement comprising:
   at least one melting furnace for melting virgin mineral wool raw material, the at least one melting furnace comprising an inlet for virgin mineral wool raw material and an outlet for molten mineral wool material;
   a mineral wool production line connected to the outlet for molten mineral wool material for producing a mineral wool product from the molten mineral wool material, wherein the mineral wool production line comprises a curing oven; and
   a fluidized bed reactor comprising an exhaust gas duct, an inlet for predetermined primary fuel, an inlet for predetermined bed material, and an outlet for an ash material, the ash material comprising bottom ash discharged via a bottom outlet from the fluidized bed reactor or fly ash separated by a particle separator from exhaust gas in the exhaust gas duct or a mixture of the bottom ash and the fly ash, together with particles of bed material removed from the fluidized bed reactor, the fluidized bed reactor further comprising an inlet for mineral wool waste, whereby the ash material comprises fine mineral wool material powdered from the mineral wool waste in the fluidized bed reactor,
   wherein the at least one melting furnace has a further inlet for the ash material so as to use the ash material as a further mineral wool raw material.

2. The arrangement for recycling mineral wool waste in accordance with claim 1, further comprising means for performing a material quality analysis of at least one of the mineral wool product, the mineral wool waste, and the further mineral wool raw material, and for generating a material quality analysis output reflecting material quality, and means for determining the material quality of at least one of the primary fuel and the bed material on the basis of the material quality analysis output.

3. The arrangement for recycling mineral wool waste in accordance with claim 1, further comprising a reactor for sintering or briquetting the ash material so as to produce an ash product.

4. The arrangement for recycling mineral wool waste in accordance with claim 1, wherein the curing oven comprises an inlet for air and means for heating the air, and the arrangement further comprising a line for conveying hot flue gas from the curing oven to the fluidized bed reactor.

5. The arrangement for recycling mineral wool waste in accordance with claim 1, further comprising means for conducting heat extracted from exhaust gas in the exhaust gas duct to the mineral wool production line.

6. The arrangement for recycling mineral wool waste in accordance with claim 1, wherein the at least one melting furnace is a cupola furnace having an inlet for coke and the arrangement further comprising means for leading coke particles having a particle size smaller than a predetermined limit from the inlet for coke to the fluidized bed reactor.

7. The arrangement for recycling mineral wool waste in accordance with claim 6, further comprising means for leading CO-comprising flue gas from the at least one melting furnace to the fluidized bed reactor.

8. The arrangement for recycling mineral wool waste in accordance with claim 1, wherein the fluidized bed reactor is a fluidized bed gasifier generating combustible gas, the arrangement further comprising means for leading a portion of the combustible gas to be combusted for producing heat in the at least one melting furnace.

9. The arrangement for recycling mineral wool waste in accordance with claim 1, wherein the fluidized bed reactor is a fluidized bed boiler generating steam to be fed to a steam turbine to generate electrical power that is used in the at least one melting furnace.

10. The arrangement for recycling mineral wool waste in accordance with claim 9, wherein the at least one melting furnace is an electrical arc furnace and the electrical power is used to power the at least one melting furnace.

11. The arrangement for recycling mineral wool waste in accordance with claim 10, further comprising a coke firing cupola furnace as a second melting furnace, means for leading coke to be used as a further fuel in the fluidized bed reactor, and means for leading CO-comprising flue gas from the cupola furnace to the fluidized bed reactor.

12. The arrangement for recycling mineral wool waste in accordance with claim 1, wherein the fluidized bed reactor is a fluidized bed gasifier generating combustible gas, the arrangement further comprising means for leading a portion of the combustible gas to be combusted for producing heat in the curing oven in the mineral wool production line.

13. The arrangement for recycling mineral wool waste in accordance with claim 1, wherein the fluidized bed reactor is a fluidized bed boiler generating steam to be fed to a steam turbine to generate electrical power that is used in the curing oven in the mineral wool production line.

* * * * *